Oct. 20, 1970 F. TRUCCO 3,535,463

SECTION STRIP FOR USE PARTICULARLY IN TELEPHONE EQUIPMENT

Filed Dec. 13, 1968 4 Sheets-Sheet 1

Oct. 20, 1970 F. TRUCCO 3,535,463

SECTION STRIP FOR USE PARTICULARLY IN TELEPHONE EQUIPMENT

Filed Dec. 13, 1968

4 Sheets-Sheet 2

Oct. 20, 1970 F. TRUCCO 3,535,463
SECTION STRIP FOR USE PARTICULARLY IN TELEPHONE EQUIPMENT
Filed Dec. 13, 1968 4 Sheets-Sheet 3
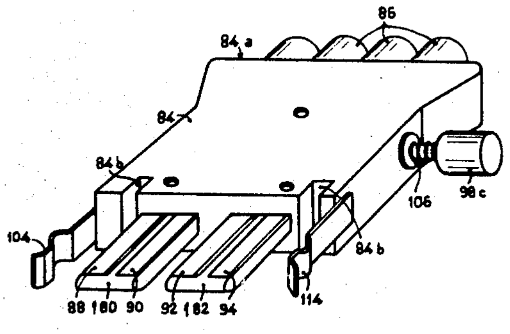
Fig. 9
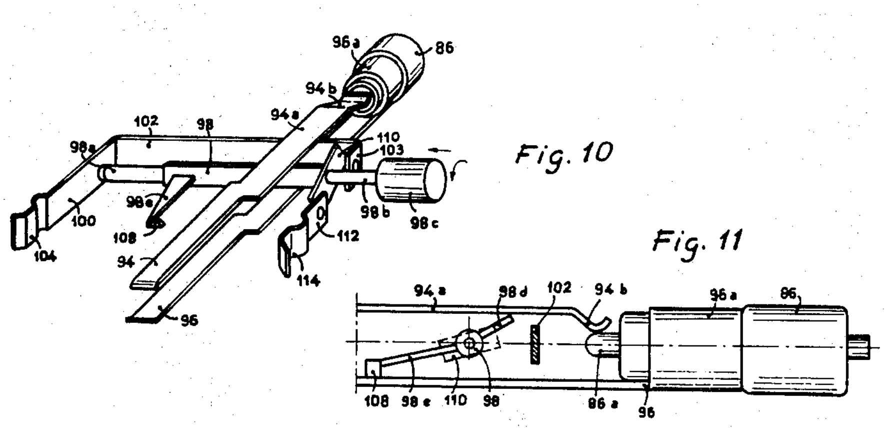
Fig. 10 Fig. 11
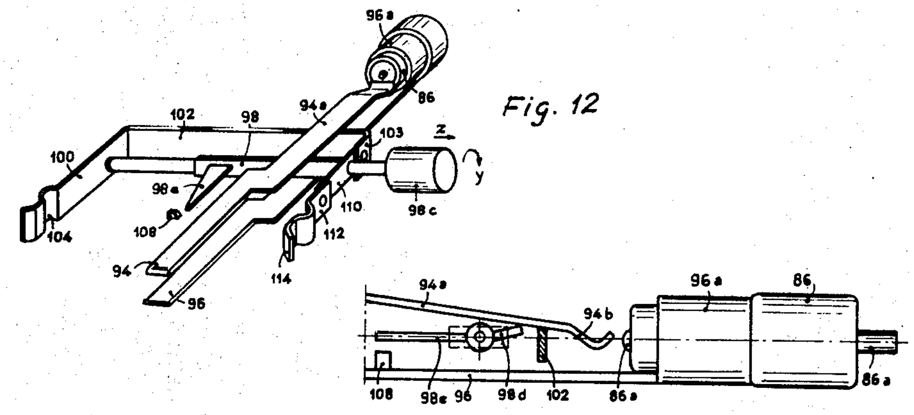
Fig. 12
Fig. 13

3,535,463

SECTION STRIP FOR USE PARTICULARLY IN TELEPHONE EQUIPMENT

Felice Trucco, Via Galimberti, Grugliasco, Italy

Filed Dec. 13, 1968, Ser. No. 783,485
Int. Cl. H04m 1/00
U.S. Cl. 179—98 12 Claims

ABSTRACT OF THE DISCLOSURE

A section strip to be used in telephone equipment to form from a plurality of such strips distributing frames, the strips being plate-shaped and adapted to be mounted on each other with their flat sides engaging to form a stack, having two sets of lamellar conductors mounted on opposite faces of the element one connecting the element to subscriber circuits the other connecting to the exchange circuits, each element being provided with overvoltage and overcurrent protective means connected to audio or video signalling devices.

This invention relates to an electric device particularly, but not exclusively, used in low voltage on telephone equipment; said device commonly called "strip" accomplishes, as known, many tasks as part of distributing frames provided or not with protective elements, the connection, the distribution and section of telephone lines.

At present, various types of strips are used in the telephone field. The manufacturers of said strips must necessarily take into account a great number of requirements flowing from their use with particular regard to the reduction of their overall dimensions, to the reliability of the different electrical component members and to their easy access for overhaul, repairs and the quick replacement of damaged units.

As known, particularly from Italian Pat. No. 732,408 of the present applicant, the object of a section strip for telephone equipment, in which such strips are mainly used, is to provide the "distributing frames" which are assemblies in which the section and switching points of the system are joined and which are provided with protective members and to connect the exchange members to the exterior system. Such strips, modified in some details of the component elements, are further used to provide section, connecting and switching points, provided or not with protective members, whether located with respect to the telephone system or with respect to any other low voltage electric system.

With particular reference to telephone distributing frame installations, it is known that the same have to satisfy a plurality of requirements which may be summarized as follows:

The possibility of a rapid connection between any number of the exchange with any conductor pair of the subscriber system;

The possibility of providing protective members for the exchange installation, both against overvoltages (lightning vacuum protectors) and against overcurrents (heat coils) which may occur on the exterior system;

The possibility of section and insulate defaulting subscribers circuits;

The possibility of inserting, on any subscriber pair, a plug connected to test apparatus;

The possibility of section and insulate any pair in order to localize and repair eventual failures;

The provision, for any pair of conductors, corresponding to any subscriber, of particular services as the telephone secretary's office, and other various services.

Further, each distributing frame or section point of the system must have such a structure as to make immediately localizable any failure which should be rapidly repaired.

In view of the stated objects and others aiming to overcome the drawbacks encountered in the use of the section strips known at present time, the strip according to the invention presents the following principal features:

The strip is formed by a plurality of plate-shaped elements, assembled in vertical or horizontal piles; the various elements are gathered and supported by a metal bracket which in turn is fixed in the desired position on a supporting frame.

The plate-shaped elements forming the strip are mutually complementary whereby being assembled with respect to the corresponding supporting plate or bracket, they form a single block, provided with protruding terminals for the various electrical connections and with the seats for suitable plugs. The block forming the strip, due to the shape of the plate-shaped elements, is sealed against dust.

Each plate-shaped element is formed by two parts: a supporting part for the various electric lamellar contacts, terminating on the sides of same support, with connecting lugs or connecting terminals to be soldered to electrical conductors; the other part, made as a removable cover having a bottom with through bores for the passage of the teeth of electrical plugs and mounted to protect the double electrical contacts formed in a special manner between each pair of frontal blades.

The plate so divided in two parts, with a removable cap or cover, allows the rapid inspection of the contacts in order to adjust them, to clean them and check and correct their shape, and the perfect alignment of the contacts and then the application of a cover protecting the contacts of each plate.

The plate-shaped elements carried by the supporting bracket or plate are provided with a wide ground contact which is established not only with respect to the plate surface but also with respect to one of the two metal tie rods provided between the two heads of the strip.

All the plate-shaped elements and their respective covers are made of molded shock-resistant and fire-resistant plastic material. It must be pointed out that the plate-shaped elements carrying the lamellar conductors are molded without incorporating the conductors and these are successively and readily fitted in their seats with the aid of pre-arranged suitable assembly reference. This feature reduces remarkably the production times and hence the production costs while it ensures the permanent superviseability of each complete element.

Each strip is provided with two opposed metal heads, formed by plates electrically insulated with respect to the correspondent plate-shaped elements, mutually locked by means of a pair of metal tension rods one of which is electrically connected to ground, and the other to the alarm circuit suitable to signal eventual failures.

Each plate-shaped element, if designed to form a distributing frame, may receive, through plug insertion, protective members against overvoltages and protective members against overcurrents.

Each plug, with heat protectors (Siemens type coils) against overcurrents is made as to electically and automatically connect to ground and to the alarm circuit the line corresponding to the blown out coil while a double mechanical type signal, optically easily distinguishable, indicates the element containing the damaged line and the blown out coil.

The strip according to the invention presents the advantage to achieve a remarkable space saving thanks to the concentration of the electrical contacts perfectly coordinated and easily distinguishably accessible.

The invention and its further features will be more readily apparent from the following exemplary description thereof with reference to the accompanying drawings, in which.

Figure 14:
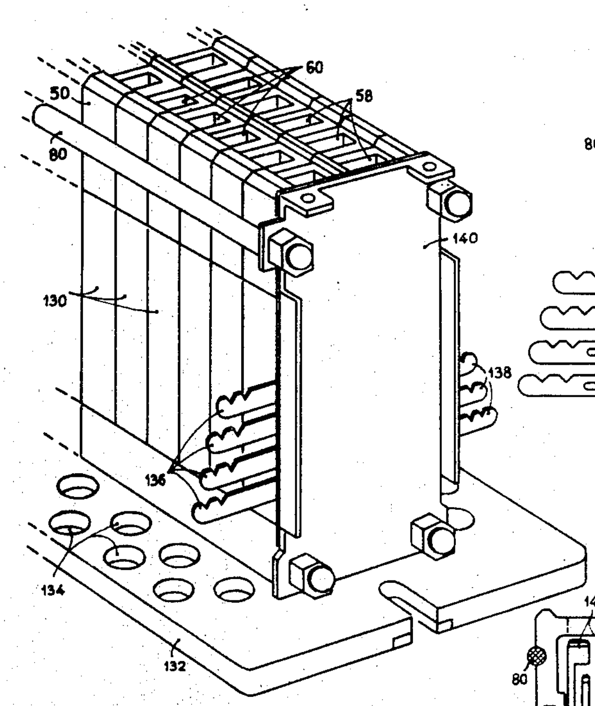
Figure 15:
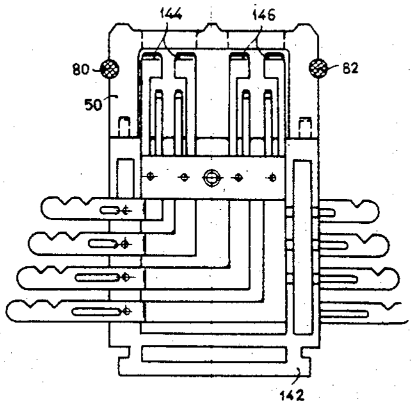

FIGS. 9 to 13, some in perspective and some in elevational view, illustrate a plug provided with thermal protective members and the operation of one of its internal electro-mechanical contacts;

FIG. 14 is a partial perspective view of a strip formed with elements being provided each one with two pairs of electrical contacts;

FIGS. 15 to 18 show some examples of plate-shaped elements, designed to form strips for electrical section provided with a different number of electrical contacts.

Figures 1, 2, 3:
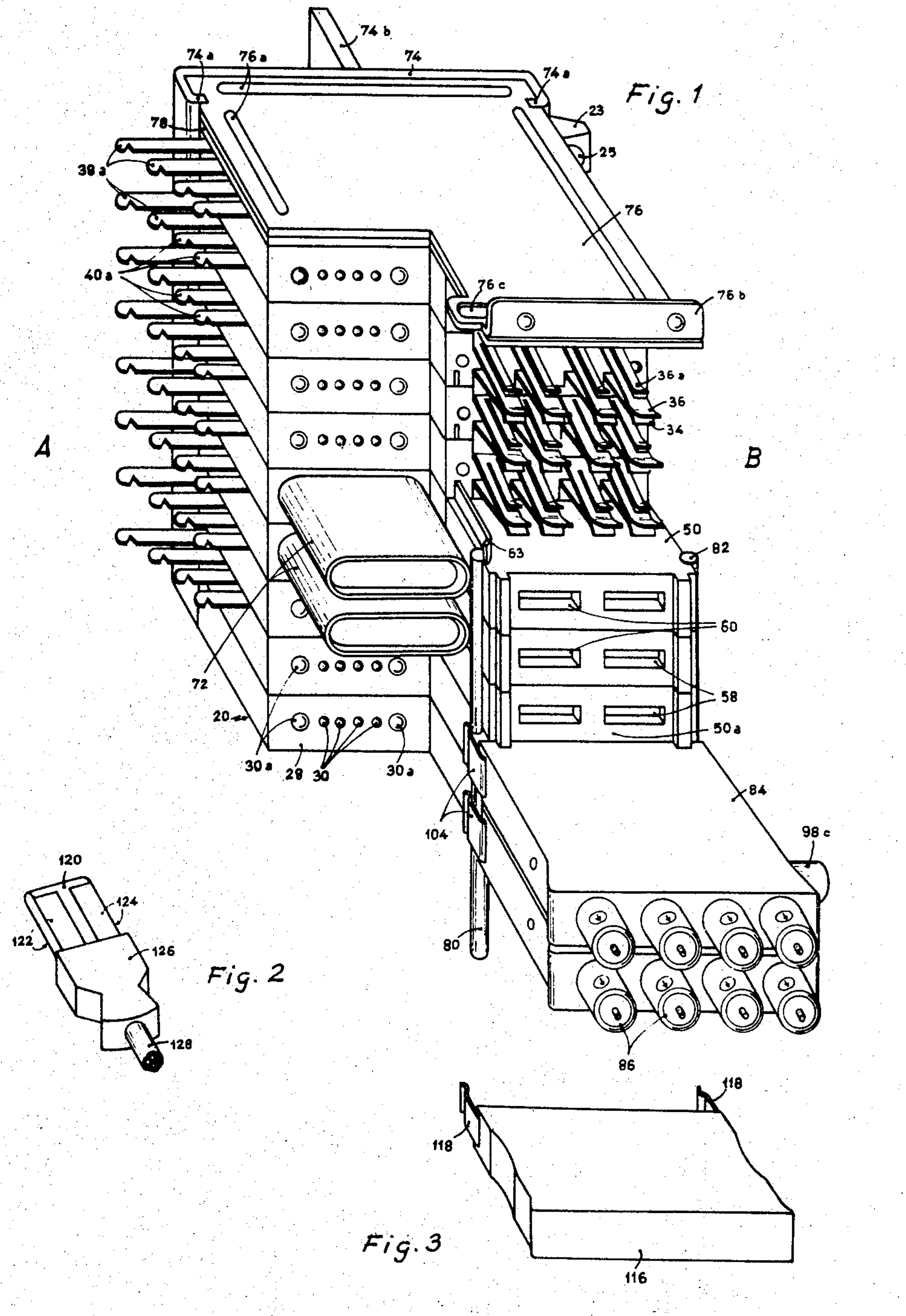
FIG. 1 is a perspective view of a strip formed by a limited number of elements which may however be different from the number represented.
FIGS. 2 and 3 illustrate respectively an electrical plug and a retainer element for the tension rods of the strip.
Figures 4, 5, 6, 7, 8:
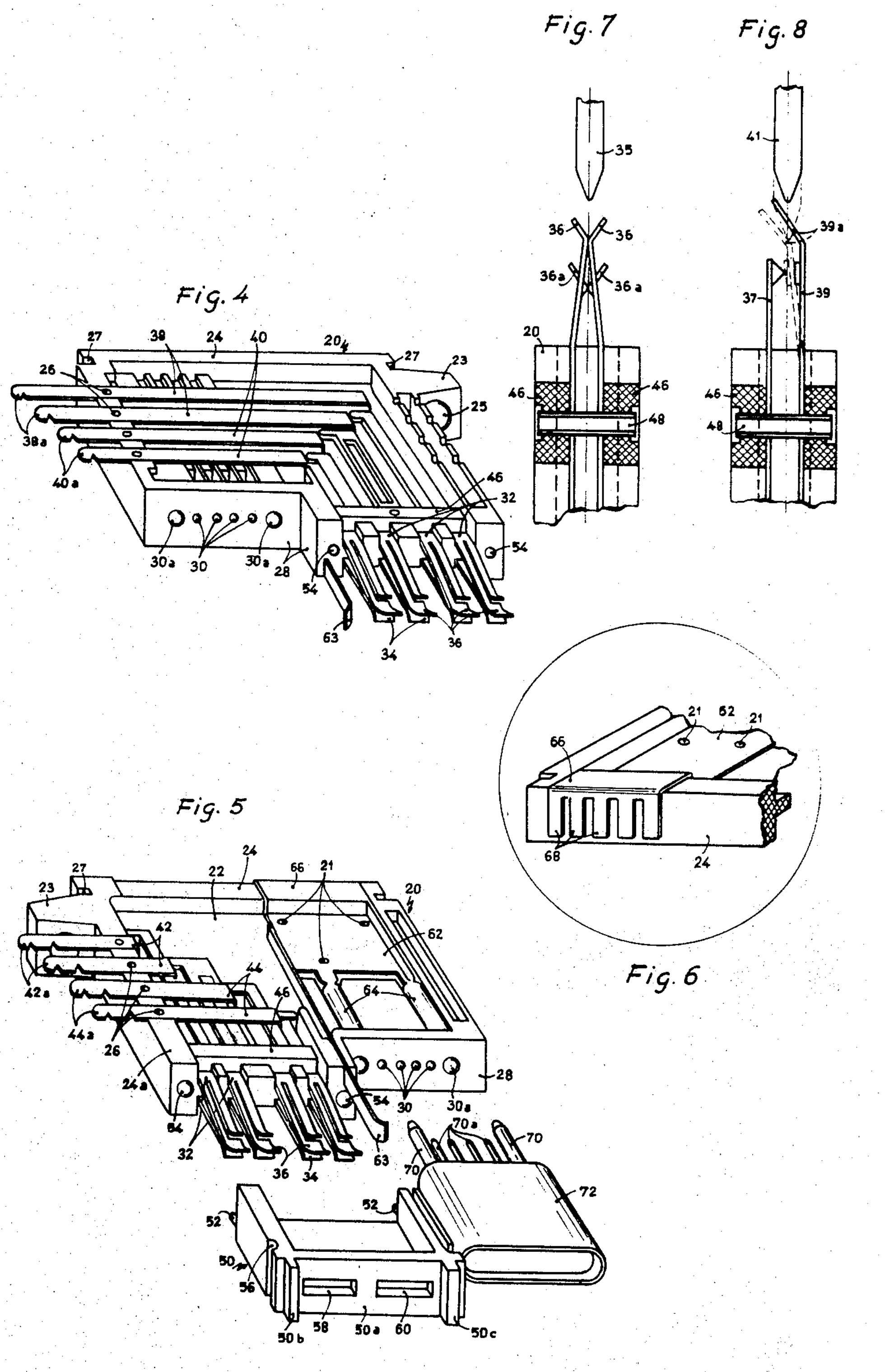
FIGS. 4 and 5 illustrate in perspective the two faces of each plate-shaped element suitable to form telephone distributing frame strips.
FIG. 6 is a detailed view of the element shown in FIGS. 4 and 5, which illustrates one of the two ground taps.
FIGS. 7 and 8 illustrate, on a larger scale and in partial cross section of the molded element, two types of electrical contacts in a side view provided in the same plate-shaped elements.

With reference to FIGS. 1, 4 and 5 of the drawings, each plate-shaped element generally indicated at 20 has a box structure on both faces formed by the presence of an intermediate diaphragm 22 and perimetrical raised edges 24. In the symmetrical and opposed edges 24*a* of each element, corresponding to the sides of the same, suitable seats and protruding foot portions 26 are formed in the molding operation; passage seats 30 for the teeth of an electrical plug and seats 32 for a plurality of lamellar electrical contacts 34, 36 are formed in the front edge 28 which in the case shown is square shaped. Contacts 34, 36 of the normally closed type, are formed by pairs of symmetrical, and facing one another, corresponding ends of metal blades, preferably made of phosphor bronze, 38, 40 and 42, 44 mounted on the opposed faces of the same element. All the blades 38, 40, 42, 44 are fixed, with respect to the plate-shaped support by heat squashing the foot portions 26 passing each one through a single corresponding bore provided transversally and at suitable height in each blade. Two transverse bars 46, one for each face, molded in insulating material and locked, for example, by means of rivets 48, FIG. 7, lock the ends 34, 36 of the electrical contacts in the desired position while allowing their elastic deformation due to straddle when a plug is inserted between them.

As already mentioned, each plate-shaped element is made of molded electrically insulating, shock-resistant and fire-resistant plastic material. Under these conditions, the blades 38 . . . 41 which, on opposed sides of each element 20, terminate with the protruding soldering lugs 38*a*, 40*a*, 42*a*, 44*a* are electrically insulated one another in pairs. In the case of FIGS. 1, 4 and 5, four pairs of electrical contacts and hence eight connecting terminals or lugs are available on each element 20; half of said terminals or lugs protrude from one side and half from the other side of the correspondent element 20.

In order to cover the pairs of contact terminals 34, 36, box elements 50, FIGS. 1 and 5, molded with the same material employed for elements 20 are provided. Said elements 50 are provided with asymmetric front projections 52 (FIG. 5) suitable to be fitted into corresponding seats 54 provided in the front edge 26 of element 20. The asymmetric arrangement of projections 52 and correspondent seats 54 defines a pedetermined assembling position of elements 50 with respect to elements 20 excluding any assembling error. The sides of each element 50 are provided with transversal grooves 56 while in the front wall of same, in the case represented, two passage openings 58, 60 are provided to admit the pins of a suitable plug. On face of element 20, shown in FIG. 5, due to the arrangement of the blade pairs 42, 44 a wide space is available in correspondence of front edge 28. Said space is almost entirely occupied by an integral flat metal element 62 provided with: cylindrical projections 64, rear edge 66, comb edge 68 (FIG. 6) and blade 63, FIGS. 1, 4 and 5. The cylindrical projections 64, fitted within suitable seats of element 20, result in axial alignment with the passage bores 30*a* designed to receive the pins 70 of plugs 72 including the protective members against eventual overvoltages from network, and hence connect pins 70 to ground tap through said projections 64 and plate 62, 66, 68, as mentioned in the following. Each plate 62 is anchored to the correspondent element 20 by heat deforming and squashing the foot portions 21, integral with element 20 and passing through corresponding bores of plate 62.

Lastly, each element 20 is provided with projections 23, bored at 25 for wire passage and further with a pair of opposed vertical notches 27 which are engaged by the bent ends 74*a* of metal support 74 integral with the metal spur 74*b* by means of which the support 74 is engaged on known frame of the distributing frame of FIG. 1.

The structure of a vertical strip is as shown in FIG. 1. A number X of elements 20 assembled in a pile stack and anchored to support 74, are tightened together by a pair of metal plates 76 having perimetrical rib 76*a* and eventually provided with a square bent lip 76*b* for the placement of an identification label. Metal plates 76 forming the opposed bases of the strip, are spaced and insulated with respect to the first and the last element 20 of same pile by means of a sheet of electrically insulating material 78. Suitable stop means prevent downward vertical sliding of the assembly. A pair of metal tension bars 80, 82 extending the whole height of the strip, engage the lateral seats 56 of the box elements or covers 50 (FIG. 5) pass through the pair of elongated openings 76*c* provided in plates 76 and by means of nuts, not represented, which engage their threaded ends, locks the pack of elements 20 and correspondent covers 50. As already mentioned, in seats 30, 30*a* are plugs 70*a*, 70 of the box member 72 containing each one a self-routing lightning vacuum protector for the quad, while in openings 58, 60 engage pins 180, 182 of special plugs 84, described later, and carrying thermal protective members 86 of Siemens type whose use and operation are well known in the telephone field.

With reference to FIG. 1, side A of the strip is the side commonly called "line side," that is, the side where to each respective pair of lugs 38*a* . . . 40*a*, a pair of conductors serving a telephone subscriber are electrically connected, while to the pairs of lugs 42*a* . . . 44*a* (not shown in FIG. 1 but represented in FIG. 5) protruding from side B, the "permutations" or conductors coming from the exchange members of "exchange side" are electrically connected. Each lug of each pair 42*a*, 44*a* is formed by a single metal blade which, being square bent, forms an end element 34, 24*a*, FIG. 7, of the double electrical contact in cooperation with end 36, 36*a*. Each lug 38*a*, 40*a* (line side) is instead formed by a pair of metal blades which, in correspondence with the protruding part on side A of the strip, are soldered together, while in the box-shaped interior of element 20 they are separate and while one forms the second element 36, 36*a* of the double electric contact, the other, bent as to form a case, is axially aligned with one of bores 30 for a corresponding pin 70*a* of plug 72. In these conditions, each plug 72 including a lightning vacuum protector becomes grounded through pins 70 and connected to the line side through pins 70*a*.

When the various elements 20 are assembled and locked with respect to support 74 by means of the pair of plates 76 and tension bars 80, 82, teeth 68 (FIG. 6) of each metal plate 62 come in electrical contact with the surface of support 74 which is electrically grounded through the metal frame onto which it is engaged or by a suitable connection; each blade 63 of each plate 20 establishes further, with its bent end, an electric contact with the metal tension bar 80 (FIG. 1) which in turn is connected to ground.

From the above it is clear that each plate 20 first of all is provided with a metal element 62, preferably of copper, which without any electrical gap which might be caused by solderings or junctions, and made of a single body, provides all the contacts required for the groundings and, further, that each plate 20 is provided with two different groundings; one very wide provided by teeth 68 contacting the inner surface of support 74, and the other provided by the contact of blade 63 with the metal tension bar 80.

While tension bar 80 is grounded, the analogous tension bar 82 is electrically insulated with respect to the end plates 76 of the strip and with respect to all the other electrically conducting parts. Said tension bar 82 is utilized as an electrical conductor for the alarm signal, as will be described later.

Each plug 84 that carries thermal protections, which in the case represented is provided for "quad" elements 20 of distributing frames (that is, for elements 20 each one provided with electrical contacts for connection with two subscribers, a pair for each subscriber), comprises a shell of molded insulating material and a pair of guide pins 180, 182 also made of insulating material and suitable to engage, by fitting, the seats 58, 60 of any box-shaped or cover element 50, FIGS. 1 and 5. Astride each pin or tooth 180, 182 there is arranged a pair of lamellar contacts; the contacts of each pair located in symmetrical oppositon on the two faces of each tooth. In FIG. 9 only four of the eight lamellar contacts are shown and respectively indicated at 88, 90, 92, 94, the other four being located on the not visible opposed face of each tooth, 180, 182. In the hollow shell of plug 84, the eight lamellar contacts project as represented on FIGS. 9 to 13 and each pair of contacts, symmetrically opposed, form a member independent and identical to the other three; therefore, on FIGS. 10 to 13 only one of the four identical members has been represented.

The extension of any one of the lamellar contacts shown in FIG. 9, for example the 94, in the inner cavity of plug 84 forms the elastic projection **94*a*, which, with its curved end 94*b* presses and establishes the electric contact with the plug 86*a* (FIG. 11) of correspondent protective heat coil. The opposed lamellar contact and corresponding to the 94 indicated in FIGS. 10 to 12 with reference 96 projects parallel and adjacent to the bottom of the cavity of plug 84, reaching to edge 84*a*, FIG. 9, where it forms a cylindrical seat 96*a*, provided with bayonet joint, not shown, for correspondent coil 86. All the pairs of lamellar contacts 94, 96 and the other identical three result therefore in mounting astride the device provided to close the alarm and grounding circuit for the pair of contacts whose coil 86 has blown out. Said device comprises a pin 98 made of insulating material whose ends are rotatably mounted with the possibility of longitudinal sliding, within suitable seats formed on the sides of the shell of plug 84. End 98*a* of said pin passes through, with suitable clearance, the metal blade 100, FIGS. 10, 12 which with its square bent branch 102 passes between the various pairs of blades 94, 96 without making any electrical contact with them. End 104 of blade 100- 102 is formed as a contact spring such outlined as to elastically snap and press upon the skirt of metal tension bar 80, FIG. 1, when plugs 84 are located in their operating seats. The other end 98*b* of pin 98, passes through a side of the shell plug 84 and terminates with a cylindrical member 98*c*. On shank 98*b* of the end of pin 98, between the side of shell 84 and the maneuver cylindrical member 98*c*, there is mounted a torsion spring 106 which for the sake of clearance is only shown in FIG. 9 of the drawing. Pin 98 is provided with a stiff and integral wing 98*d*, FIGS. 11 and 12 made of insulating material which affects all the upper contact blades 94*a***. Nearly in diametrical opposition with respect to said wing, the same pin is further provided with a stop finger

**98*e* whose end, against the action of spring 106, is engaged against tooth 108 fixed on the bottom of shell 84. Lastly, on pin 98, made of insulating material, a metal plate 110, FIGS. 10, 12, in correspondence with the facing ends 103 of blade 100, 102 and 112 of contact blade 114**.

The free end of blade 114, shaped similarly to 104, when plug 84 is mounted in operating seat, establishes the electrical contact with the skirt of metal tension bar 82, FIG. 1, which is a part of the alarm circuit.

As clearly visible in FIGS. 1, 5 and 9, while front side **50*a* of each shell 50 is provided with front asymmetrical teeth of different thickness, 50*b*, 50*c*, the shell of plug 84 is provided with corresponding seats 84*b*, 84*c* respectively which together with said teeth, define the predetermined assembling position of each plug 84**.

The operation of plug 84 provided with coils 86 is the following:

The initial position of contact blades 94, **94*a*, 94*b* (and hence 88, 90, 92) is that shown in FIGS. 10 and 11. Finger 98*e* is engaged by stop 108; the wing 98*d* grazes the lower surface of elastic blades 94*a* . . . ; spring 106 is actuated; the end 94*b* of each blade is retained by plug 86*a* of correspondent heat coil 86**.

If for any cause, one of coils 86 blows out, its plug **86*a* shifts from position represented on FIGS. 10 and 11 to that of FIGS. 12 and 13, the corresponding contact blade, indicated by 94*a* on drawing, snaps elastically downward and, acting upon wing 98*d* causes pin 98 to move angularly as to disengage the end of finger 98*e* of stop 108. Owing to the reaction of spring 106, pin 98 is also caused to be displaced axially as indicated by arrow Z in FIG. 13 beside the angular movement indicated by arrow Y. Due to this compound movement, blade 94*a* establishes contact with branch 102 of blade 100 which, through its end 104 contacting tension bar 80, closes in ground circuit the conductor terminating on the contact pair 34, 36 through correspondent lugs, line side of strip and further, blade 110 due to axial displacement of pin 98 closes the electrical circuit between blade 112, 114 and end 103 of ground contact. End 114 of said blade makes electrical contact with tension bar 82 being part of the alarm circuit. Said circuit becomes operative, energizing electro-luminous and/or electro-acoustic means signaling the failure on line. The operator in charge locates easily and at once plug 84 where the blown out coil 86 is, since he notices visually that the cylindrical maneuver member 98*c* protrudes with respect to the alignment of the others; hence he also notices rapidly and visually the blown out coil 86 because plug 86*a*** of same protrudes with respect to the normal alignment of the others.

What has been described so far relates to section strips particularly used to form telephone distributing frames, provided or not with plugs 72 carrying protective members against overvoltages and plugs 84 carrying protective members against overcurrents. It is evident that both in a plurality of distributing frame strips, each formed, for example by pile stacks of fifty elements 20, are used only on those elements connected to the subscriber line and may be easily removed from a seat to be used in another analogous seat of the same or of another distributing frame strip.

FIG. 3 illustrates a member having the function to prevent metal tension bars 80, 82 of each strip to straddle. Said member comprises an insulating support 116 provided with a front pair of elastic branches 118 insulated one another and having the same gauge established for the ends 104, 114 of ground and alarm contacts of plugs 84. The use and the assembly of said member is more useful, instead of plugs 84, on distributing frame strips without protective plugs 84. In that case, said member, mounted on front side **50*a* of cover 50 tightens with the elastic branches 118, against the sides of cover 50, the tension bars 80, 82** preventing their deformation.

FIG. 2 illustrates an electric plug provided with a single tooth 120, made of an insulating material, on whose opposed faces are arranged two pairs of symmetrical and opposed electric contact blades 122 and 124. A cable 128, formed by four conductors which may be connected to any test instrument or equipment, extends from body 126 of the plug made of insulating material. Plug 126 which may be inserted into one of seats 60 or 58 and hence make contact with two pairs of contacts, 34, 36 is suitable for the simultaneous section and/or control of a pair of contacts, that is, of the line corresponding to a subscriber.

Obviously, similar plugs may be designed for the sectionalizing or the control of three, four or more pairs.

FIG. 14 illustrates a sectionalizing strip formed by quad elements 130. According to an embodiment, the base metal support 132, is provided with a plurality of transverse bores 134 for the passage of cables comprising the conductors connectable to lugs 136, 138. There are still the metal end plates 140 of the strip, and the metal bars or tie rods 80, 82 for the eventual respective ground and alarm taps of eventual plugs insertable into the seats of the dust cover cap 50. The plate-shaped elements forming said strip are illustrated, in a plan view, in FIG. 15.

Figures 16, 17, 18:
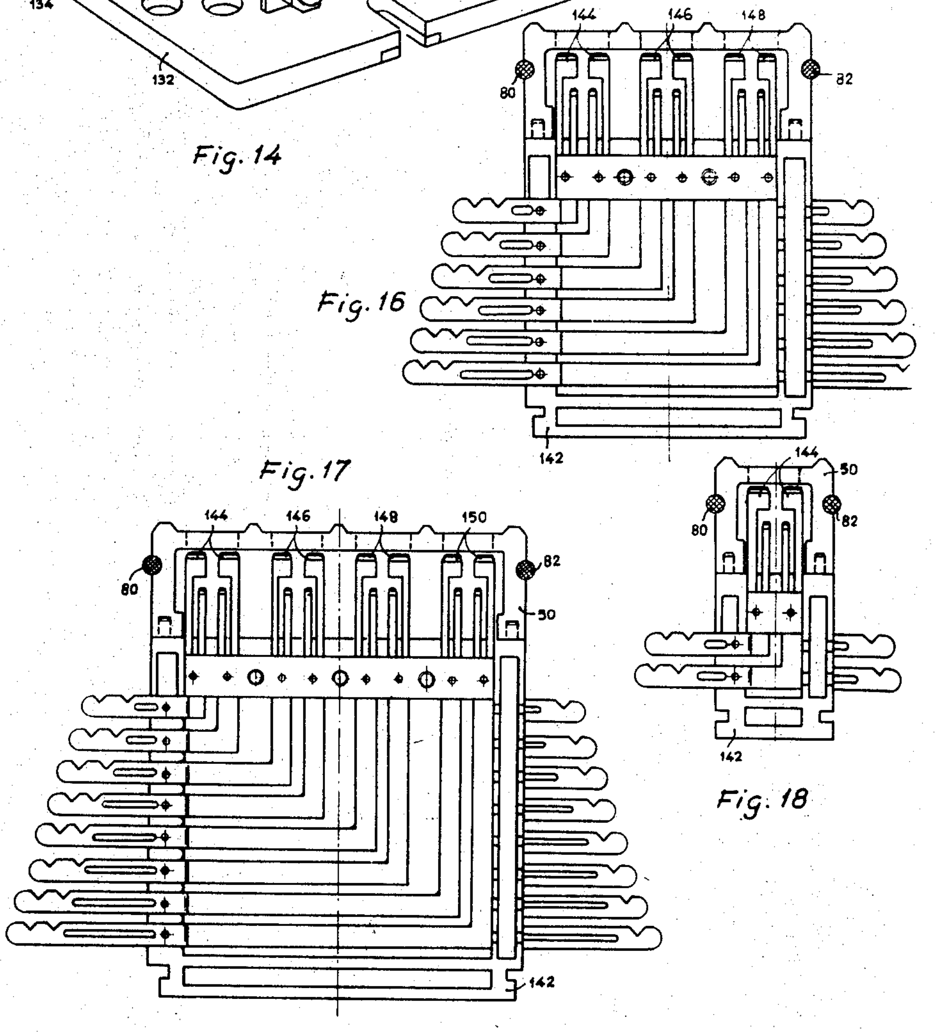

FIGS. 16, 17, 18 illustrate a plan view, elements similar to elements 20 but without a seat for the protective members against overvoltages. In said elements, the support made of insulating material 142, preferably with a parellelepiped shape, changes in the dimensions of its sides in relation with the number of quad 144, 146 . . . 150 for which it is provided but still remaining the use of tension bars 80, 82, of a base support plate and of the dust cover caps 50.

This latter type of strip is particularly suitable for the use, beside the telephone field, in any electrical plant where rapid commutations are required between electrical lines for the various services. In effect having available a plurality of electrical conductors of adequate length, whose ends are provided with plugs suitable to engage seats 58, 60, cross connections between any line connected to a strip and any line connected to another strip, may be made rapidly.

With reference to FIGS. 1, 4, 5, 7 and from 15 to 18 the ends for the contact between facing blades, accessible with suitable plugs through passage bores 58, 60 of the dust covers 50, as clearly represented, divide as a fork 34, **34*a* and 36, 36*a*, on FIG. 7. This feature is very important, particularly in the telephone field as for the checking of any line, when a plug 35 is inserted between contacts 34, 36 it is possible to carry out any checking operation, including listening, without causing any interruption of the electrical circuit maintained by contacts 34*a*, 36*a* as these contacts are the repetition of the first formed by the same contact elastic blades. Further, if the telephone line corresponding to the contacts interested is working, no interruption occurs neither inserting or disconnecting, with respect to said double contacts, plug 84** of FIG. 9, or any other type of plug, provided it is not a section plug, because when a pair of contacts open the second pair is always closed, directly or through the electrical members carried by the plug.

Lastly, as represented on FIG. 8, in some cases the contacts of certain elements may be provided normally open instead of normally closed. In effect blades 37, 39 are normally separate while the insertion of plug 41 made of insulating material engages branch **39*a* of blade 39 and closes the electrical circuit between the same and blade 37**.

The dust cover 50 for each plate is a very important feature of the strip according to the invention because, as already mentioned, the temporary removing of said cover allows the immediate access to the electrical contacts avoiding all the drawbacks that may be caused by wrong contacts, oxidation, etc.

From what has been described so far, the advantages flowing from the use of the strip according to the invention may be summarized as follows:

Considerable reduction of over-all dimensions with respect to the distributing frame and/or section strips employed at present time and consequent appreciable saving of space;

Reduction of production costs flowing from, the simplified manufacturing process for elements 20 for which the bare molding of the only part made of plastic material is provided without the inclusion of metal parts, and the rapid assembly of the various blades for the electrical contacts;

Considerable technical improvement of each strip, flowing from the simple and technically perfect structure of each component element; in effect the blades for electrical contacts and the ground taps give a wide reliability, far higher with respect to the strips known heretofore;

It is possible to have distributing frame strips provided with a double protection against overcurrents and against overvoltages and elements individually inspectionable. In effect, it is sufficient to loosen the nuts of the ends of tension bars 80, 82, open wide apart moderately the same and remove the dust cover 50 of any element 20 in order to effect the inspection and the eventual setup of the elastic contacts 34, 36;

It is possible to test, during the assembling, each plate-shaped element complete with its electrical parts, giving to contacts 34, 36—**34*a*, 36*a*, the correct tension and then mount the cover 50** protecting them against accidental deformations;

It is possible to form strips of any desired length by increasing or reducing the number of the plate-shaped elements;

Double signal visual and electric (through acoustic and/or luminous alarm equipments) of any failure that may occur on line;

Perfect protection against atmospheric agents of the electric contacts which are perfectly sheltered within mobile covers 50, particularly against the effects of dust.

In the structure of distributing frames, thanks to the use of the strip according to the invention, protective plugs 72–84 with respective protective members having a high cost, are initially omitted and used on elements 20 only as they are being connected to subscribers. Substantially, the strip structure is such as to make possible to form distributing frames of large dimensions and power and, limiting the use of protective members to the plate-shaped elements effectively connected to subscribers.

What is claimed is:

1. Section strip comprising fittable complementary elements adapted to form distributing frames, connecting heads and sections, for lines, particularly in telephone equipment, said elements forming the strip are plate-shaped and adapted to be pile assembled by perfectly being superimposed upon each other, a supporting plate, said elements being mutually lockable with respect to said plate, a pair of tension bars arranged on sides of cover means provided one for each plate-shaped element, said tension bars assisting locking of said elements, each plate-shaped element has a box structure open on both faces forming opposing cavities; said structure being formed by the presence of an intermediate diaphragm with respect to raised edges on both faces of each element, in said opposing box cavities of each plate-shaped element seats provided for a plurality of lamellar electrical conductors, a predetermined number of said conductors being mounted on a face of said element and protruding with one of their ends at one side of the associated element, while with the other end they form one of the electrical contact members in cooperation with respective ends of lamellar conductors mounted on the opposite face of the same plate-shaped element, said lamellar conductors having free ends mounted on a second face of said plate-shaped element said free ends protruding in symmetrical opposition and on opposed side with respect to the respective ends on said one side forming thereby two sets of lamellar conductors, the ends of the two sets of lamellar conductors forming a plurality of electrical contacts aligned parallel to a plane on which a corresponding plate-shaped element lies, and are held and contained within said cover means, said cover means having a bottom portion with a passage therein to allow the passage and access of suitable plugs insertable between said electrical contacts, each plate-shaped element being molded in a synthetic, fire and shock-resistant electrically insulating material.

2. Section strip according to claim 1, wherein said two sets of ends of the lamellar electrical conductors are mounted on oppositely lying faces of each plate-shaped element and present a ragged edge, and the ones protruding on a side are adapted to be connected to electrical conductors of the telephone subscriber system, and the ones protruding on the opposite side to be connected to the exchange members.

3. Section strip according to claim 2, wherein the ends frontally protruding of the two sets of said lamellar conductors form electrical contacts adapted to receive suitable plugs and when said conductors are arranged to form normally closed contacts, are individually fork shaped, and comprise a terminal end with two teeth, one backward with respect to the other in order to form, in cooperation with the respective end of an opposite conductor, two successive contacts, shifted and spaced apart, one with respect to the other in the direction of insertion of the plug so that the electrical circuit established remains unchanged when the corresponding plug is inserted but disrupted between the pair of contacts which are advanced towards the entrance of same plug, leaving unchanged the position of the second.

4. Section strip according to claim 1 including a further plate-shaped element wherein a removable cover element is mounted to protect the lamellar ends of the conductors forming, for each pair, a double electric contact, and is so formed as to present a predetermined assembling position in order to prevent errors during the formation of the strip.

5. Section strip according to claim 1, including a support metal plate having a substantially C-shaped cross-section having bent ends engaging seats formed in the outline of each plate-shaped element, said elements being individually provided with a ground tap in the form of a comb edge obtained from a metal plate mounted in one of the cavities of the element, said comb edge being folded back on the bottom edge of a corresponding plate-shaped element and is adapted to enter and remain in electrical contact with the facing surface of the support metal plate which is electrically grounded in order to form for each plate-shaped element one of the two ground taps provided for each element.

6. Section strip according to claim 5, wherein each plate-shaped element is provided with two ground taps, one formed by a comb edge of a metal plate mounted within a suitable seat on each plate-shaped element and the other formed by a blade integral with said metal plate and forwardly protruding with respect to the plate-shaped element and such shaped as to contact the skirt of one of a pair of tension metal bars engaging transversally the elements forming the strip, said tension bar being electrically grounded.

7. Section strip according to claim 6, wherein one of the two metal tension bars transversally engaging the elements forming the strip, is electrically grounded while the other of said bars is electrically insulated with respect to the frame and the support of the correspondent strip, and is connected to an alarm circuit connected to signaling devices designed to signal any failure concerning any circuit connected to any one of the plate-shaped elements.

8. Section strip according to claim 7, wherein each plate-shaped element is arranged to receive directly a protective member carrying a lightning vacuum protector against overvoltages which may occur on the system, and through said passage of said bottom portion of the covers mounted to protect the electrical contacts, is adapted to receive a plug carrying the protective members against overcurrents such as a heat coil.

9. Section strip comprising a plurality of plate-shaped elements protective plugs, as claimed in claim 8, wherein each plug carrying protections against overcurrents is internally provided with a rocker member which is under the action of resilient blades, one for each electrical contact, and each having its end retained by the plug of a protective heat coil through which the electrical circuit is closed, when in presence of an overcurrent in any of the circuits connected to a predetermined plate-shaped element, a coil of correspondent protective plug blows out and releases the corresponding resilient blade, such blade acts on said rocker member which trips and shifts from a rest position to a working position closing predetermined electrical contacts to ground the circuit relative to the blown out coil and further to close an alarm circuit which actuates said signalling means.

10. Section strip including protective plugs according to claim 9, wherein said protective plugs are mounted in an operating seat and are aligned with the pins of said associated protective heat coils and actuating members to actuate the rockers of each plug, and whereby the pin of any blown out coil, as well as the actuating member of any actuated rocker are translated by an axial movement which brings them to protrude from normal alignment, into a clearly distinct condition with respect to the others, thus providing the possibility to localize immediately the failure points.

11. Section strip according to claim 1, wherein each plate-shaped element is provided with at least one seat for the insertion of plugs of the protective type against overcurrents, or plugs for electrical tests.

12. Section strip according to claim 11 the lamellar electrical contacts are of the normally open type and the insertion of a suitable plug causes said contacts to close.

References Cited

UNITED STATES PATENTS 3,462,558 8/1969 Selz ---------------- 179—98

KATHLEEN H. CLAFFY, Primary Examiner

J. S. BLACK, Assistant Examiner

U.S. Cl. X.R.

339—158, 207

UNITED STATES PATENT OFFICE
CERTIFICATE OF CORRECTION

Patent No. 3,535,463 Dated October 20, 1970

Inventor(s) Felice Trucco

It is certified that error appears in the above-identified patent and that said Letters Patent are hereby corrected as shown below:

In the heading to the printed specification, under line 5, insert -- Claims priority, application Italy, December 18, 1967, 54154-A/67 --.

Signed and sealed this 29th day of June 1971.

(SEAL)
Attest:

EDWARD M.FLETCHER,JR.
Attesting Officer

WILLIAM E. SCHUYLER, JR.
Commissioner of Patents